US009818243B2

(12) United States Patent
Fitzgibbon

(10) Patent No.: US 9,818,243 B2
(45) **Date of Patent: *Nov. 14, 2017**

(54) SYSTEM INTERACTION WITH A MOVABLE BARRIER OPERATOR METHOD AND APPARATUS

(71) Applicant: The Chamberlain Group, Inc., Elmhurst, IL (US)

(72) Inventor: James J. Fitzgibbon, Batavia, IL (US)

(73) Assignee: The Chamberlain Group, Inc., Oak Brook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/921,584

(22) Filed: Jun. 19, 2013

(65) Prior Publication Data

US 2013/0278379 A1 Oct. 24, 2013

Related U.S. Application Data

(63) Continuation of application No. 12/971,374, filed on Dec. 17, 2010, which is a continuation of application No. 12/341,658, filed on Dec. 22, 2008, now Pat. No. 7,876,218, which is a continuation of application No. 11/044,928, filed on Jan. 27, 2005, now Pat. No. 7,482,923.

(51) Int. Cl.

| | |
|---|---|
| ***G05B 19/00*** | (2006.01) |
| ***G07C 9/00*** | (2006.01) |
| ***G08B 13/22*** | (2006.01) |
| ***E05F 15/70*** | (2015.01) |

(52) U.S. Cl.
CPC .......... *G07C 9/00007* (2013.01); *E05F 15/70* (2015.01); *G08B 13/22* (2013.01)

(58) Field of Classification Search
None
See application file for complete search history.

(56) References Cited

U.S. PATENT DOCUMENTS

| | | | |
|---|---|---|---|
| 1,446,850 | A | 11/1849 | Pone |
| 1,076,850 | A | 10/1913 | Wedderburn |
| 1,406,850 | A | 2/1922 | Hadaway |
| 2,980,827 | A | 4/1961 | Hill |
| 3,536,836 | A | 10/1970 | Pfeiffer |
| 4,325,146 | A | 4/1982 | Lennington |

(Continued)

FOREIGN PATENT DOCUMENTS

| | | |
|---|---|---|
| AU | 2013254889 | 5/2014 |
| CA | 2831589 | 5/2014 |

(Continued)

OTHER PUBLICATIONS

4Sight Internet Brochure; http://4sightsolution.4frontes.com/document/4CB-4S00-0809; Carrollton, TX; 2009; 5 pgs.

(Continued)

*Primary Examiner* — Julie Lieu
(74) *Attorney, Agent, or Firm* — Fitch Even Tabin & Flannery LLP

(57) ABSTRACT

A secure communication link is provided between a movable barrier operator and a peripheral system. Information conveyed via this link is used by one, the other, or both such elements to further inform or direct their respective actions.

20 Claims, 1 Drawing Sheet

(56) References Cited

U.S. PATENT DOCUMENTS

| | | | | |
|---|---|---|---|---|
| 4,360,801 | A | 11/1982 | Duhame | |
| 4,408,251 | A | 10/1983 | Kaplan | |
| 4,464,651 | A | 8/1984 | Duhame | |
| 4,533,905 | A | 8/1985 | Leivenzon | |
| 4,573,046 | A | 2/1986 | Pinnow | |
| 4,583,081 | A | 4/1986 | Schmitz | |
| 4,629,874 | A * | 12/1986 | Pugsley et al. | 235/380 |
| 4,821,024 | A | 4/1989 | Bayha | |
| 4,881,148 | A | 11/1989 | Lambropoulos | |
| 4,922,224 | A | 5/1990 | Drori | |
| 4,987,402 | A | 1/1991 | Nykerk | |
| 5,003,293 | A | 3/1991 | Wu | |
| 5,047,928 | A * | 9/1991 | Wiedemer | 705/52 |
| 5,155,680 | A * | 10/1992 | Wiedemer | 705/52 |
| 5,191,268 | A | 3/1993 | Duhame | |
| 5,247,440 | A | 9/1993 | Capurka | |
| 5,255,341 | A | 10/1993 | Nakajima | |
| 5,278,832 | A | 1/1994 | Binzel | |
| 5,280,527 | A | 1/1994 | Gullman | |
| 5,283,549 | A | 2/1994 | Mehaffey | |
| 5,402,105 | A | 3/1995 | Doyle | |
| 5,444,440 | A | 8/1995 | Heydendahl | |
| 5,473,318 | A | 12/1995 | Martel | |
| 5,475,377 | A | 12/1995 | Lee | |
| 5,541,585 | A | 7/1996 | Duhame | |
| 5,565,843 | A | 10/1996 | Meyvis | |
| 5,565,857 | A | 10/1996 | Lee | |
| 5,596,840 | A | 1/1997 | Teich | |
| 5,608,778 | A | 3/1997 | Partridge, III | |
| 5,656,900 | A | 8/1997 | Michel | |
| 5,689,236 | A | 11/1997 | Kister | |
| 5,731,756 | A | 3/1998 | Roddy | |
| 5,780,987 | A | 7/1998 | Fitzgibbon | |
| 5,781,107 | A | 7/1998 | Ji | |
| 5,805,064 | A | 9/1998 | Yorkey | |
| 5,805,082 | A | 9/1998 | Hassett | |
| 5,883,579 | A | 3/1999 | Schreiner | |
| 5,886,634 | A | 3/1999 | Muhme | |
| 5,917,405 | A | 6/1999 | Joao | |
| 5,940,000 | A | 8/1999 | Dykema | |
| 5,969,637 | A | 10/1999 | Doppelt | |
| 5,990,828 | A | 11/1999 | King | |
| 6,002,332 | A | 12/1999 | King | |
| 6,011,468 | A | 1/2000 | Lee | |
| 6,026,165 | A | 2/2000 | Marino | |
| 6,028,537 | A | 2/2000 | Suman | |
| 6,070,361 | A | 6/2000 | Paterno | |
| 6,127,740 | A | 10/2000 | Roddy et al. | |
| 6,131,019 | A | 10/2000 | King | |
| 6,154,544 | A | 11/2000 | Farris | |
| 6,161,005 | A | 12/2000 | Pinzon | |
| 6,166,634 | A | 12/2000 | Dean | |
| 6,184,641 | B1 | 2/2001 | Crimmins | |
| 6,192,282 | B1 | 2/2001 | Smith | |
| 6,223,029 | B1 | 4/2001 | Stenman | |
| 6,225,903 | B1 | 5/2001 | Soloway | |
| 6,266,540 | B1 | 7/2001 | Edgar, III | |
| 6,271,765 | B1 | 8/2001 | King | |
| 6,278,249 | B1 | 8/2001 | Fitzgibbon | |
| 6,310,548 | B1 | 10/2001 | Stephens, Jr. | |
| 6,326,754 | B1 | 12/2001 | Mullet | |
| 6,346,889 | B1 | 2/2002 | Moss | |
| 6,356,868 | B1 | 3/2002 | Yuschik | |
| 6,388,559 | B1 | 5/2002 | Cohen | |
| 6,400,265 | B1 | 6/2002 | Saylor | |
| 6,404,337 | B1 | 6/2002 | Van | |
| RE37,784 | E | 7/2002 | Fitzgibbon | |
| 6,427,913 | B1 | 8/2002 | Maloney | |
| 6,434,158 | B1 | 8/2002 | Harris | |
| 6,434,408 | B1 | 8/2002 | Heckel | |
| 6,448,894 | B1 | 9/2002 | Desai | |
| 6,476,708 | B1 | 11/2002 | Johnson | |
| 6,476,732 | B1 | 11/2002 | Stephan | |
| 6,484,784 | B1 | 11/2002 | Weik, III | |
| 6,525,645 | B2 | 2/2003 | King | |
| 6,553,238 | B1 | 4/2003 | Ginzel | |
| 6,553,881 | B2 | 4/2003 | Marmin | |
| 6,561,255 | B1 | 5/2003 | Mullet | |
| 6,563,430 | B1 | 5/2003 | Kemink | |
| 6,564,056 | B1 | 5/2003 | Fitzgerald | |
| 6,597,291 | B2 | 7/2003 | Tsui | |
| 6,616,034 | B2 | 9/2003 | Wu | |
| 6,634,408 | B2 | 10/2003 | Mays | |
| 6,661,340 | B1 | 12/2003 | Saylor et al. | |
| 6,686,838 | B1 | 2/2004 | Rezvani | |
| 6,717,528 | B1 | 4/2004 | Burleson | |
| 6,781,516 | B2 | 8/2004 | Reynard et al. | |
| 6,782,662 | B2 | 8/2004 | McCartney | |
| 6,792,083 | B2 | 9/2004 | Dams | |
| 6,803,851 | B1 | 10/2004 | Kramer | |
| 6,803,882 | B2 | 10/2004 | Hoetzel | |
| 6,812,849 | B1 | 11/2004 | Ancel | |
| 6,822,603 | B1 | 11/2004 | Crimmins | |
| 6,823,188 | B1 | 11/2004 | Stern | |
| 6,833,681 | B2 | 12/2004 | Fitzgibbon | |
| 6,850,163 | B1 | 2/2005 | Adamczyk | |
| 6,891,838 | B1 | 5/2005 | Petite | |
| 6,903,650 | B2 | 6/2005 | Murray | |
| 6,919,790 | B2 | 7/2005 | Kanazawa | |
| 6,924,727 | B2 | 8/2005 | Nagaoka | |
| 6,933,843 | B1 | 8/2005 | Hom et al. | |
| 6,960,998 | B2 | 11/2005 | Menard | |
| 6,975,202 | B1 | 12/2005 | Rodriguez | |
| 6,975,226 | B2 | 12/2005 | Reynard et al. | |
| 6,980,117 | B1 | 12/2005 | Kirkland | |
| 6,980,131 | B1 | 12/2005 | Taylor | |
| 6,989,760 | B2 | 1/2006 | Dierking | |
| 6,998,977 | B2 | 2/2006 | Gregori | |
| 7,038,409 | B1 | 5/2006 | Mullet | |
| 7,057,494 | B2 | 6/2006 | Fitzgibbon | |
| 7,071,813 | B2 | 7/2006 | Fitzgibbon | |
| 7,071,850 | B1 | 7/2006 | Fitzgibbon et al. | |
| 7,091,688 | B2 | 8/2006 | Gioia | |
| 7,124,943 | B2 | 10/2006 | Quan | |
| 7,127,847 | B2 | 10/2006 | Fitzgibbon | |
| 7,142,849 | B2 | 11/2006 | Neuman | |
| 7,158,007 | B2 | 1/2007 | Kawamoto | |
| 7,161,319 | B2 | 1/2007 | Ergun | |
| 7,161,466 | B2 | 1/2007 | Chuey | |
| 7,167,076 | B2 | 1/2007 | Wilson | |
| 7,170,998 | B2 | 1/2007 | McLintock | |
| 7,190,266 | B2 | 3/2007 | Mullet | |
| 7,197,278 | B2 | 3/2007 | Harwood | |
| 7,205,908 | B2 | 4/2007 | Tsui | |
| 7,207,142 | B2 | 4/2007 | Mullet | |
| 7,221,289 | B2 | 5/2007 | Hom | |
| 7,227,444 | B2 | 6/2007 | Fitzgibbon | |
| 7,262,683 | B2 | 8/2007 | Maeda | |
| 7,266,344 | B2 | 9/2007 | Rodriquez | |
| 7,269,416 | B2 | 9/2007 | Guthrie | |
| 7,274,300 | B2 | 9/2007 | Duvernell et al. | |
| 7,289,014 | B2 | 10/2007 | Mullet | |
| 7,298,240 | B2 | 11/2007 | Lamar | |
| 7,306,145 | B2 | 12/2007 | Sakai | |
| 7,310,043 | B2 | 12/2007 | Mamaloukas | |
| 7,323,991 | B1 | 1/2008 | Eckert | |
| 7,331,144 | B2 | 2/2008 | Parsadayan | |
| 7,332,999 | B2 | 2/2008 | Fitzgibbon | |
| 7,365,634 | B2 | 4/2008 | Brookbank | |
| 7,370,074 | B2 | 5/2008 | Alexander | |
| 7,380,375 | B2 | 6/2008 | Maly | |
| 7,392,944 | B2 | 7/2008 | Shieh | |
| 7,424,733 | B2 | 9/2008 | Kamiwada | |
| 7,446,644 | B2 | 11/2008 | Schaffzin | |
| 7,464,403 | B2 * | 12/2008 | Hardman, Jr. | 726/14 |
| 7,468,676 | B2 * | 12/2008 | Styers et al. | 340/686.1 |
| 7,471,199 | B2 | 12/2008 | Zimmerman | |
| 7,482,923 | B2 | 1/2009 | Fitzgibbon | |
| 7,493,726 | B2 | 2/2009 | Fitzgibbon | |
| 7,498,936 | B2 | 3/2009 | Maeng | |
| 7,532,965 | B2 | 5/2009 | Robillard | |
| 7,561,075 | B2 | 7/2009 | Fitzgibbon et al. | |
| 7,600,550 | B2 | 10/2009 | Mays | |
| 7,616,090 | B2 | 11/2009 | Baker | |

(56) References Cited

U.S. PATENT DOCUMENTS 7,708,048 B2 5/2010 Mays
7,724,687 B2 5/2010 Autret
7,741,951 B2 6/2010 Fitzgibbon
7,750,890 B2 7/2010 Fitzgibbon
7,761,186 B2 7/2010 Keller
7,778,604 B2 8/2010 Bauman et al.
7,783,018 B1 8/2010 Goldberg
7,852,212 B2 12/2010 Fitzgibbon
7,853,221 B2 12/2010 Rodriguez
7,856,558 B2 12/2010 Martin
7,876,218 B2 1/2011 Fitzgibbon
7,983,160 B2 7/2011 Gunatilake
7,983,180 B2 7/2011 Harrington
7,994,896 B2 8/2011 Fitzgibbon
7,995,460 B2 8/2011 Edgar, III
8,014,528 B2 9/2011 Bunte
8,040,217 B2 10/2011 Fitzgibbon
8,063,592 B2 11/2011 Shier
8,144,011 B2 3/2012 Fitzgibbon
8,175,591 B2 5/2012 Fitzgibbon
8,207,818 B2 6/2012 Keller, Jr.
8,239,481 B2 8/2012 Alexander
8,290,515 B2* 10/2012 Staton et al. .............. 455/456.6
8,368,509 B2 2/2013 Fitzgibbon
8,416,054 B2 4/2013 Fitzgibbon
8,421,591 B2 4/2013 Karasek
8,423,788 B2* 4/2013 Holtzman et al. ............ 713/189
8,544,523 B2 10/2013 Mays
8,561,348 B2 10/2013 Kurth
8,577,392 B1 11/2013 Pai
8,587,404 B2 11/2013 Laird
8,643,465 B2 2/2014 Fitzgibbon
8,797,138 B2 8/2014 Myers
8,868,220 B2 10/2014 Crucs
9,122,254 B2 9/2015 Cate
9,141,099 B2 9/2015 Cate
9,317,985 B2 4/2016 Tehranchi
9,367,978 B2 6/2016 Sullivan
2001/0011941 A1 8/2001 King et al.
2001/0017483 A1 8/2001 Frohberg
2002/0014954 A1 2/2002 Fitzgibbon
2002/0033760 A1 3/2002 Kobayashi
2002/0067308 A1 6/2002 Robertson
2002/0162175 A1 11/2002 Berglund
2002/0178385 A1 11/2002 Dent
2002/0180582 A1 12/2002 Nielsen
2002/0180600 A1 12/2002 Kirkland
2002/0183008 A1 12/2002 Menard
2003/0016119 A1 1/2003 Teich
2003/0016139 A1 1/2003 Teich
2003/0018478 A1 1/2003 Mays
2003/0023881 A1 1/2003 Fitzgibbon
2003/0029579 A1 2/2003 Mays
2003/0043021 A1 3/2003 Chung
2003/0071590 A1* 4/2003 Roman .................. E05F 15/70
318/282
2003/0097586 A1 5/2003 Mok
2003/0098778 A1 5/2003 Taylor
2003/0118187 A1 6/2003 Fitzgibbon
2003/0151493 A1 8/2003 Straumann
2003/0182132 A1 9/2003 Niemoeller
2003/0193388 A1 10/2003 Ghabra
2003/0216139 A1 11/2003 Olson
2003/0222754 A1 12/2003 Cho
2004/0012481 A1 1/2004 Brusseaux
2004/0012483 A1 1/2004 Mays
2004/0036573 A1 2/2004 Fitzgibbon
2004/0176107 A1 9/2004 Chadha
2004/0210327 A1 10/2004 Robb
2004/0212498 A1 10/2004 Peterson
2004/0229569 A1 11/2004 Franz
2004/0239482 A1 12/2004 Fitzgibbon
2004/0257189 A1 12/2004 Chang
2004/0257199 A1 12/2004 Fitzgibbon
2005/0012631 A1 1/2005 Gregori
2005/0030179 A1 2/2005 Script
2005/0033641 A1* 2/2005 Jha et al. ........................ 705/14
2005/0035873 A1 2/2005 Kimura
2005/0044906 A1 3/2005 Spielman
2005/0076242 A1* 4/2005 Breuer .......................... 713/201
2005/0085248 A1 4/2005 Bailey
2005/0088281 A1* 4/2005 Rohrberg ........... G07C 9/00182
340/5.71
2005/0099299 A1 5/2005 Tyroler
2005/0110639 A1 5/2005 Puzio
2005/0113080 A1* 5/2005 Nishimura .................... 455/420
2005/0134426 A1 6/2005 Mullet et al.
2005/0146417 A1 7/2005 Sweatte
2005/0170777 A1 8/2005 Harwood et al.
2005/0174250 A1* 8/2005 Dierking ............ G07C 9/00309
340/686.1
2005/0195066 A1 9/2005 Vandrunen
2005/0206497 A1 9/2005 Tsui
2005/0242923 A1 11/2005 Pearson
2005/0245233 A1 11/2005 Anderson
2005/0258937 A1 11/2005 Neuwirth
2005/0272372 A1 12/2005 Rodriguez
2005/0273372 A1 12/2005 Bowne
2006/0038656 A1 2/2006 Wilson
2006/0056663 A1 3/2006 Call
2006/0077035 A1 4/2006 Mamaloukas
2006/0091998 A1 5/2006 Fitzgibbon
2006/0103503 A1 5/2006 Rodriquez
2006/0132284 A1 6/2006 Murphy
2006/0137261 A1 6/2006 Maly
2006/0145811 A1 7/2006 Nantz
2006/0147052 A1 7/2006 Wikel
2006/0153122 A1 7/2006 Hinman
2006/0158344 A1 7/2006 Bambini et al.
2006/0164208 A1 7/2006 Schaffzin
2006/0170533 A1 8/2006 Chioiu
2006/0187034 A1 8/2006 Styers
2006/0214783 A1 9/2006 Ratnakar
2006/0220785 A1 10/2006 Ferdman
2006/0223518 A1 10/2006 Haney
2006/0261932 A1* 11/2006 Ando et al. .............. 340/426.14
2006/0279399 A1 12/2006 Chuey
2006/0281008 A1 12/2006 Mitani
2007/0005605 A1 1/2007 Hampton
2007/0005806 A1 1/2007 Fitzgibbon
2007/0028339 A1 2/2007 Carlson
2007/0046428 A1 3/2007 Mamaloukas
2007/0058811 A1 3/2007 Fitzgibbon et al.
2007/0116194 A1 5/2007 Agapi
2007/0146118 A1 6/2007 Rodriguez
2007/0159301 A1 7/2007 Hirt
2007/0171046 A1 7/2007 Diem
2007/0177740 A1 8/2007 Nakajima
2007/0183597 A1 8/2007 Bellwood et al.
2007/0185597 A1 8/2007 Bejean et al.
2007/0283339 A1* 12/2007 Hardman, Jr. ................ 717/168
2007/0290792 A1 12/2007 Tsuchimochi
2008/0061926 A1 3/2008 Strait
2008/0092443 A1 4/2008 Herman
2008/0106370 A1 5/2008 Perez
2008/0108301 A1 5/2008 Dorenbosch
2008/0130791 A1 6/2008 Fitzgibbon
2008/0132220 A1 6/2008 Fitzgibbon
2008/0224886 A1 9/2008 Rodriguez et al.
2008/0303706 A1 12/2008 Keller
2009/0005080 A1 1/2009 Forstall
2009/0063293 A1 3/2009 Mirrashidi
2009/0064056 A1 3/2009 Anderson
2009/0102651 A1 4/2009 Fitzgibbon
2009/0160637 A1* 6/2009 Maeng ....................... 340/539.1
2009/0273438 A1 11/2009 Sultan
2009/0302997 A1 12/2009 Bronstein
2009/0315751 A1 12/2009 Bennie
2010/0120450 A1 5/2010 Herz
2010/0141381 A1 6/2010 Bliding
2010/0141514 A1 6/2010 Bell
2010/0242360 A1 9/2010 Dyas
2010/0242369 A1 9/2010 Laird
2010/0289661 A1 11/2010 Styers

(56) References Cited

U.S. PATENT DOCUMENTS

| | | | | |
|---|---|---|---|---|
| 2010/0297941 | A1 | 11/2010 | Doan | |
| 2010/0299517 | A1 | 11/2010 | Jukic et al. | |
| 2011/0025456 | A1 | 2/2011 | Bos | |
| 2011/0032073 | A1 | 2/2011 | Mullet | |
| 2011/0055909 | A1 | 3/2011 | Dowlatkhah | |
| 2011/0084798 | A1 | 4/2011 | Fitzgibbon | |
| 2011/0109426 | A1 | 5/2011 | Harel | |
| 2011/0130134 | A1 | 6/2011 | VanRysselberghe | |
| 2011/0193700 | A1 | 8/2011 | Fitzgibbon | |
| 2011/0205013 | A1 | 8/2011 | Karasek | |
| 2011/0234367 | A1* | 9/2011 | Murphy | E05F 15/77 340/3.7 |
| 2011/0254685 | A1 | 10/2011 | Karasek | |
| 2011/0258076 | A1 | 10/2011 | Muirbrook | |
| 2011/0311052 | A1 | 12/2011 | Myers | |
| 2011/0316667 | A1 | 12/2011 | Tran | |
| 2012/0098638 | A1 | 4/2012 | Crawford | |
| 2012/0188054 | A1 | 7/2012 | Bongard | |
| 2012/0249289 | A1 | 10/2012 | Freese | |
| 2012/0280783 | A1 | 11/2012 | Gerhardt | |
| 2012/0280789 | A1 | 11/2012 | Gerhardt | |
| 2012/0280790 | A1 | 11/2012 | Gerhardt | |
| 2013/0017812 | A1 | 1/2013 | Foster | |
| 2013/0057695 | A1 | 3/2013 | Huisking | |
| 2013/0060357 | A1 | 3/2013 | Li | |
| 2013/0060358 | A1 | 3/2013 | Li | |
| 2013/0093563 | A1 | 4/2013 | Adolfsson | |
| 2013/0147600 | A1 | 6/2013 | Murray | |
| 2013/0151977 | A1 | 6/2013 | Arteaga-King | |
| 2013/0257589 | A1 | 10/2013 | Mohiuddin | |
| 2013/0290191 | A1 | 10/2013 | Dischamp | |
| 2013/0328663 | A1 | 12/2013 | Ordaz | |
| 2014/0021087 | A1 | 1/2014 | Adler | |
| 2014/0118111 | A1 | 5/2014 | Saladin | |
| 2014/0125499 | A1 | 5/2014 | Cate | |
| 2014/0184393 | A1* | 7/2014 | Witkowski | G07C 5/008 340/12.5 |
| 2014/0253285 | A1 | 9/2014 | Menzel | |
| 2014/0266573 | A1 | 9/2014 | Sullivan | |
| 2015/0221147 | A1 | 8/2015 | Daniel-Wayman | |
| 2016/0010382 | A1 | 1/2016 | Cate | |

FOREIGN PATENT DOCUMENTS

| | | | |
|---|---|---|---|
| DE | 19801119 | C1 | 9/1999 |
| EP | 0422190 | | 10/1990 |
| EP | 846991 | | 6/1998 |
| EP | 0913979 | A2 | 5/1999 |
| EP | 1151598 | | 6/2000 |
| EP | 1227027 | | 7/2002 |
| FR | 2989799 | A1 | 10/2013 |
| GB | 2404765 | | 2/2005 |
| JP | 2002019548 | | 1/2002 |
| JP | 2004088774 | | 3/2004 |
| JP | 4864457 | | 2/2012 |
| KR | 2002032461 | | 5/2002 |
| WO | 9012411 | | 10/1990 |
| WO | 9515663 | A1 | 6/1995 |
| WO | 9923614 | | 5/1999 |
| WO | 0036812 | | 6/2000 |
| WO | 0193220 | | 12/2001 |
| WO | 02075542 | | 9/2002 |
| WO | 2009088901 | | 7/2009 |
| WO | 2011055128 | | 5/2011 |

OTHER PUBLICATIONS

828LM—LiftMaster Internet Gateway; http://www.liftmastercom/consumerweb/pages/accessoriesmodeldetaiLaspx?modelld=2407; printed Oct. 30, 2012.

Arrayent; White Paper: Six System Requirements for an Internet-Connected Product Line; Copyright 2010; http://arrayent.com/pdfs/SixSystemRequirementsforInternetConnectedProductsLine.pdf.

Automatic Garage Door Closer Manual—Protectrix 18A—Dated Mar. 31, 2009.

Bill Peisel; "Designing the Next Step in Internet Applicances" Electronic Design/Mar. 23, 1998.

Examination Report Dated Apr. 3, 2012 issuing from New Zealand Patent Application No. 599055.

Examination Report from New Zealand Patent Application No. 599055 dated Apr. 3, 2012.

EZSrve-Insteon/X10 Home Automation Gateway—Model #5010L; hap://www.simplehomenet.com/proddetail.asp?prod+9357342317, accessed Sep. 2011.

George Lawton; "Dawn of the Internet Appliance" Computer, Industry Trends; Oct. 1, 1997.

HomeSeer HS2—Home Automation Software; http://store.homeseer.com/store/HomeSeer-HS2-Home-Automation-Software-Download-P103.aspx; Accessed Sep. 2011.

Ian Bryant and Bill Rose; "Home Systems: Home Controls;" p. 1-322; © 2001 Parks Associates.

Infinias Mobile Credential App for Android DroidMill; Known and printed as early as Dec. 19, 2011; http://droidmill.com/infinias-mobile-credential-1364120.html.

Intelli-M eIDC32; Ethernet-Enabled Integrated Door Controller; www.infinias.com; Known and printed as early as Dec. 19, 2011.

Internet Connected Garage Door Opener; Open New Doors at Sears; http://www.sears.corri/shc/s/p_10153_12605_00930437000P?prdNo=I&blockNo=1&blockType=G1; printed Oct. 30, 2012.

K.K. Tan, Y.L. Lim and H.L. Goh; "Remote Adaptive Control and Monitoring" IEEE (c) 2002.

Kenmore Connect; http:/www.kenmore.com/shc/s/dap_10154_12604_DAP_Kenmore+Connect; 2010 Sears Brands, LLC.

Kurt Scherf, Michael Greeson and Tricia Parks; "Primary Perspectives: "E-Enabled" Home Security;" pp. 1-87; © 2003 Parks Associates.

LiftMaster; MyQ Enabled Accessory: LiftMaster Internet Gateway (Model 828); Known as of Dec. 19, 2011.

Liftmaster Debuts New Intelligence in Garage Door Openers at IDS 2011; New Generation of LiftMaster Models and Accessories Enabled by MyQ Technology; Elmhurst, IL; Jun. 7, 2011; http://www.liftmaster.com/NR/rdonlyres/0A903511-21AB-4F0A-BBCD-196D41503CF2/4305/LiftMasterUneilsMyQTechnologyIDA2011_FINAL.pdf.

LiftMaster Internet Gateway: Your Simple Solution to Home Control; http://www.liftmaster.com/consumerweb/products/IntroducingLiftMasterInternetGateway, printed Oct. 30, 2012.

Miele's Remote Vision Explained; http://www.miclensa.com/service/remote_vision/verify.aspx; Accessed Feb. 2012.

Peter M. Corcoran and Joe Desbonnet; "Browser-Style Interfaces to a Home Automation Network" Manuscript received Jun. 18, 1997, IEEE (c) 1997.

Press Release; Kenmore Uneils Reolutionary Technology Enabling Laundry Applicances to 'Talk' to Customer Serice Experts; PR Newswire, pNA, Aug. 4, 2010.

Protectrix Wireless automatic Garage Door Closer Timer Opener Security Accessory; http://www.closethegarage.com; printed Oct. 30, 2012.

Somfy's Slick Tahoma Z-Wire and RTS Home Automatation Gateway; Thomas Ricker; posted Janaury 4, 2011; http://www.engadget.com/2011/01/04/softys-tahoma-z-wave-and-rts-home-automation-gateway/.

Stephen Shankland; "Need to lend your key? E-Mail it, Frauhofer says" news.cnet.com/8301-1035_3-57572338-94/need-to-lend-your-key-e-mail-it-fraunhofer-says/; pp. 1-5; CNET News, Mar. 4, 2013.

Summary of Findings From Parks Associates\ Early Reports; pp. 9-13; Apr. 15, 2013 by Parks Associates.

The Craftsman Brant Announces Garage Door Opener of the Future—PR Newswire; The Sacramento Bee; http://www.sac bee.com/2011/09/27/2941742/the-craftsman-brand-announces.html; Sep. 27, 2011.

ULStandard for Safety for Door, Drapery, Gate, Louver, and Window Operators and Systems, UL 325 Fifth Edition, Dated Jun. 7, 2002; pp. 1-186.

(56) References Cited

OTHER PUBLICATIONS

Wayne-Dalton Press Area—New Z-Wave enabled prodrive; http://www.wayne-dalton.com/newsitem98.asp; Printed Oct. 13, 2011.
Xanboo XPC280 Wireless Universal Garage Door Control—Smarthome; http://www.smarthome.comf75066/Xanboo-XPC280-Wireless-Universal-Garage-Door-Control/p.aspx, printed Oct. 30, 2012.
Combined Search and Examination Report Cited in British Patent Application No. GB1025649.5; Dated: Aug. 8, 2012.
Examination Report Dated May 29, 2013 from British Patent Application No. GB1205649.5.
www.brinkshomesecurity.com/home-security-systems-and-pricing/security-equipment/security-equipment_htm as printed on Feb. 11, 2009.
"Now You Can Close Your Garage Door With a Smartphone;" Copyright 2011 USA Today; http://content.usatoday.com/communities/driveon/post/2011/09/now-you-can-control-your-garage-door-from-your-smartphone.
ActieHome PC Home Automation System; http://www.x10.com/promotions/sw31a_activehome_hmp.html?WENTY11; accessed Sep. 2011.
Fully-Loaded ActiveHome Pro PC Hom Automation System; http://www.x10.com/promotions/cm15a_loaded_ps. html ; accessed Sep. 2011.
Hassan A. Artail; "A Distributed System of Network-Enabled Microcontrollers for Controlling and Monitoring Home Devices" IEEE 2002.
Hawking Technologies HomeRemote Wireless Home Automation Gateway Pro Starter Kit; The HRGZ2 HomeRemote Gateway; Smart Home Systems, Inc.; http://www.smarthomeusa.com/ShopByManufacturer/Hawking-Technologies/Item/HRPS1/; Accessed Sep. 2011.
HomeRemote Wireless Home Automation Gateway—PracticallyNetworked.com; Review date Aug. 2007; http://222.practicallynetworked.com/review.asp?pid=690; Accessed Sep. 2011.
How to Internet-Connect Your Low Cost Consumer Retail Embedded Design; How to Prototype an Internet Connect Product; Hershy Wanigasekara; Sep. 13, 2010; http://www.eetimes.com/design/embedded/4027637/Internet-Connect-your-low-cost-consumer-retail-embedded-design.
How to Internet-Connect Your Low Cost Consumer Retail Embedded Design; How to Prototype an Internet Connected Product; Hershy Wanigasekara; Sep. 13, 2010; http://www.eetimes.com/design/embedded/4027637/Internet-Connect-your-low-cost-consumer-retail-embedded-design.
How to Internet-Connect Your Low Cost Consumer Retail Embedded Design; Internet Connect Product Implementation Design Patterns; Hershy Wanigasekara; Sep. 13, 2010; http://www.eetimes.com/design/embedded/4027637/Internet-Connect-your-low-cost-consumer-retail-embedded-design.
MiCasa Verde.com—Vers2; http://www.micasaverde.com/vera.php; Accessed Sep. 2011.
Susan Cotterell, Frank Vahid, Walid Najjar, and Harry Hsieh; "First Results with eBlocks: Embedded Systems Building Blocks" University of California, Rkverside pp. 168-175; Codes+ISSS'03, Oct. 1-3, 2003.
The Intelli-M eIDC32; True IP Access Control; htto://www.infinias.com/main/Products/eIDCController.aspx; Known and printed as early as Dec. 19, 2011.
Universal Devices—ISY-99i Series; http://www.universal-devices.com/99i.htm; Accessed Sep. 2011.
Canadian Patent Application No. 2,533,795; Second Office Action Dated Dec. 30, 2013.
Examination Report Under Section 18(3) for GB1205649.5 Dated Feb. 12, 2014.
Examination Report Under Section 18(3) for GB1205649.5 Dated Jun. 11, 2014.
4th Usenix; Windows Systems Symposium; Seattle, Washington USA; Aug. 3-4, 2000; A Toolkit for Building Dependable and Extensible Home Networking Applications; Yi-Min Wang, Wilf Russell and Anish Arora.
6POWER, IPv6 and PLC for home automation; Terena 2004; Jordi Palet & Francisco Ortiz.
Authentication vs. Encryption; Be in Control with Control Networks; Feb. 10, 2004; http://www.buildings.com/DesktcpModulesIBB ArlicleMaxfArticleDeta I/BBArticleDetai lPrintaspx7ArlicleID=1740& Template=standm-d_Pri nt.ascx &siteID=1.
Big blue builds home network technology; McCune, Heather; http://search.proquest.com/docview/194229104?accountid=12492; Apr. 2003.
Controlling the Status Indicator Module of the Stanley Garage Door Opener Set; Rene Braeckman; Apr. 6, 2000.
Detroit Free Press Home Computing Column; Detroit Free; Newman, Heather; http :// search.proquest.com/docview/4632707 4 7?accountid=12492; Knight Ridder/Tribune Business News; ©2002, last updated Dec. 13, 2011.
Diomidis D. Spinellis; The information furnace: consolidated home control; Received: Jun. 1, 2002 / Accepted: Aug. 14, 2002; © Springer-Verlag London Limited 2003.
Doug Olenick; Motorola Broadens Home Automation Line; http :// search.proquest.com/docview/232255560?accountid=12492; vol. 20, ©Jan. 6, 2005; last updated Sep. 1, 2011.
International Conference on Sensors and Control Techniques (IeSC 2000); Desheng Jiang, Anbo Wang, Fume and Temperature Alarm and Intelligent Control System of the District for Fire-Proof, Jun. 19-21, 2000, Wuhan, China, vol. 4077.
Net2 User Manual; Version 3; Paxton Access; "Date code: 281002".
Secure Smart Homes using• Jini and UIUC SESAME; Jalal Al-Muhtadi et al.; 1063-9527/00 © 2000 IEEE.
Security System Installation Manual; Caretaker and Custom Versions; Interactive Technologies, Inc.; Issue Date May 5, 1994.
Security System Installation Manual; Caretaker and Custom Versions; Interactive Technologies, Inc.; Text No. 46-908-01 Rev. A; 1995.
Smart Networks for Control; Reza S. Raji;IEEE Spectrum Jun. 1994.
Svein Anders Tunheim; Wireless Home Automation Systems Require Low Cost and Low Power RF-IC Solutions; Wireless Home Automation Systems (rev. 1.0) May 16, 2002; p. 1 of 8.
The iDorm—a Practical Deployment of Grid Technology; Anthony Pounds -Cornish, Arran Holmes; Intelligent Interactive Environments Group, University of Essex, UK; Proceedings of the 2nd IEEE/ACM International Symposium on Cluster Computing and the Grid (CCGRIO'02) 0-7695-1582-7/02 © 2002 IEEE;.
The Information Furnace: Consolidated Home Control; Diomidis D. SpinellisDepartment Management Science and Technology Athens University of Economics and Business; Personal and Ubiquitous Computing archive; vol. 7 Issue 1, May 2003.
The Information Furnace: User-friendly Home Control; Diomidis D. Spinellis, Department Management Science and Technology, Athens University of Economics and Business; SANE 2002; 3rd Int'l Sys. Admin. and Networking Conf. Proc., pp. 145-175, May 2002.
Towards Dependable Home Networking: An Experience Report; Yi-Min Wang, Wilf Russell, Anish Arora, JunXu, Rajesh K. Jagannathan, Apr. 18, 2000, Technical Report, MSR-TR-2000-26, Microsoft Research, Microsoft Corporation.
Xanboo Future Product; http://www.xanboo.com/xanproducts/newproducts.htm Feb. 2002, Xanboo Inc.
XPress Access; Simple Personal Management; ©2001 Andover Controls Corporation BR-XPACCESS-A.
Defendant's Motion to Dismiss Second Amended Complaint Due to Patent Invalidity Under 35 U.S.C. § 101; NDIL Case 14-cv-05197; Mar. 17, 2015.
Memorandum in Support of Defendant\s Motion to Dismiss Second Amended Complaint Due to Patent Invalidity Under 35 U.S.C. § 101; NDIL Case 14-cv-05197; Exhibit A; U.S. Pat. No. 6,998,977; Mar. 17, 2015.

(56) References Cited

OTHER PUBLICATIONS

Memorandum in Support of Defendant\s Motion to Dismiss Second Amended Complaint Due to Patent Invalidity Under 35 U.S.C. § 101; NDIL Case 14-cv-05197; Exhibit B; U.S. Pat. No. 7,852,212; Mar. 17, 2015.
Memorandum in Support of Defendant\s Motion to Dismiss Second Amended Complaint Due to Patent Invalidity Under 35 U.S.C. § 101; NDIL Case 14-cv-05197; Exhibit C; U.S. Pat. No. 8,144,011; Mar. 17, 2015.
Memorandum in Support of Defendant\s Motion to Dismiss Second Amended Complaint Due to Patent Invalidity Under 35 U.S.C. § 101; NDIL Case 14-cv-05197; Exhibit D; U.S. Pat. No. 7,876,218; Mar. 17, 2015.
Memorandum in Support of Defendant\s Motion to Dismiss Second Amended Complaint Due to Patent Invalidity Under 35 U.S.C. § 101; NDIL Case 14-cv-05197; Exhibit E; U.S. Pat. No. 7,482,923; Mar. 17, 2015.
Memorandum in Support of Defendant\s Motion to Dismiss Second Amended Complaint Due to Patent Invalidity Under 35 U.S.C. § 101; NDIL Case 14-cv-05197; Exhibit F; U.S. Pat. No. 7,071,850; Mar. 17, 2015.
Memorandum in Support of Defendant\s Motion to Dismiss Second Amended Complaint Due to Patent Invalidity Under 35 U.S.C. § 101; NDIL Case 14-cv-05197; Exhibit G; Dictionary of Computer and Internet Terms; Douglas Downing; Michael A. Covington and Melody Mauldin Covington; Barrons; Mar. 17, 2015.
Memorandum in Support of Defendant\s Motion to Dismiss Second Amended Complaint Due to Patent Invalidity Under 35 U.S.C. § 101; NDIL Case 14-cv-05197; Mar. 17, 2015.
Defendant Invalidity Contentions regarding U.S. Pat. No. 6,998,977, Exhibit 16, Apr. 20, 2015.
Defendant Invalidity Contentions regarding U.S. Pat. No. 7,482,923, Exhibit 20, Apr. 20, 2015.
Defendant Invalidity Contentions regarding U.S. Pat. No. 7,852,212, Exhibit 18, Apr. 20, 2015.
Defendant Invalidity Contentions regarding U.S. Pat. No. 7,876,218, Exhibit 19, Apr. 20, 2015.
Defendant Invalidity Contentions regarding U.S. Pat. No. 8,144,011, Exhibit 17, Apr. 20, 2015.
Nortek Security & Control LLC's Notice of Supplemental Authority Relevant to Defendant's Motion to Dismiss Second Amended Complaint Due to Patent Invalidity Under 35 U.S.C. § 101; *Chamberlain* vs. *Linear LLC and Nortek Security & Control LLC*; Case No. 1:14-cv-05197; 3 pages, Dated Apr. 29, 2015.
Opposition to Defendant's Motion to Dismiss Second Amended Complaint Due to Alleged Patent Invalidity Under 35 U.S.C. 101; *Chamberlain* vs. *Linear LLC and Nortek Security & Control LLC*; Case No. 1:14-cv-05197; 28 pages; Dated Apr. 7, 2015.
Plaintiff Chamberlain Group, Inc.'s Response to Defendant Nortek Security Control LLC's Notice of Supplemental Authority Relevant to Defendant's Motion to Disucss Second Amended Complaint Due to [Alleged] Patent Invalidity Under 35 U.S.C. § 101; *Chamberlain* vs. *Linear LLC and Nortek Security & Control LLC*; Case No. 1:14-cv-05197; 10 Pages; Dated May 12, 2015.
Reply in Support of Defendant's Motion to Dismiss Second Amended Complaint due to Patent Invalidity Under 35 U.S.C. § 101; *Chamberlain* vs. *Linear LLC and Nortek Security & Control LLC*; Case No. 1:14-cv-05197; 21 Pages; Dated Apr. 21, 2015.
*Wireless Media Innovations LLC* v. *Maherterminals LLC* (2015 WL 1810378 (D.N.J.) Apr. 20, 2015) Submitted as Document #60 in *Chamberlain* vs. *Linear LLC and Nortek Security & Control LLC*; Case No. 1:14-cv-05197, 11 Pages; Apr. 29, 2015.
Exhibit A to The Chamberlain Group Inc.'s Initial Response to Defendants' First Supplemental Initial Invalidity Contentions; *Chamberlain* vs. *Linear LLC and Nortek Security & Control LLC*; Case No. 1:14-cv-05197; 82 pages, Dated Jun. 5, 2015.
Exhibit B to The Chamberlain Group Inc.'s Initial Response to Defendants' First Supplemental Initial Invalidity Contentions; *Chamberlain* vs. *Linear LLC and Nortek Security & Control LLC*; Case No. 1:14-cv-05197; 45 pages, Dated Jun. 5, 2015.
Exhibit C to The Chamberlain Group Inc.'s Initial Response to Defendants' First Supplemental Initial Invalidity Contentions; *Chamberlain* vs. *Linear LLC and Nortek Security & Control LLC*; Case No. 1:14-cv-05197; 20 pages, Dated Jun. 5, 2015.
Exhibit D to The Chamberlain Group Inc.'s Initial Response to Defendants' First Supplemental Initial Invalidity Contentions; *Chamberlain* vs. *Linear LLC and Nortek Security & Control LLC*; Case No. 1:14-cv-05197; 29 pages, Dated Jun. 5, 2015.
Exhibit E to The Chamberlain Group Inc.'s Initial Response to Defendants' First Supplemental Initial Invalidity Contentions; *Chamberlain* vs. *Linear LLC and Nortek Security & Control LLC*; Case No. 1:14-cv-05197; 17 pages, Dated Jun. 5, 2015.
First Supplemental Invalidity Chart, Exhibit 16, U.S. Pat. No. 6,998,977; NDIL Case 14-cv-05197; Dated May 6, 2015, 95 pages
First Supplemental Invalidity Chart, Exhibit 17, U.S. Pat. No. 8,144,011; NDIL Case 14-cv-05197; Dated May 6, 2015, 73 pages.
First Supplemental Invalidity Chart, Exhibit 18, U.S. Pat. No. 7,852,212; NDIL Case 14-cv-05197; Dated May 6, 2015, 50 pages.
First Supplemental Invalidity Chart, Exhibit 19, U.S. Pat. No. 7,876,218; NDIL Case 14-cv-05197; Dated May 6, 2015, 76 pages.
First Supplemental Invalidity Chart, Exhibit 20, U.S. Pat. No. 7,482,923; NDIL Case 14-cv-05197; Dated May 6, 2015, 33 pages.
Nortek Security & Control LLC's First Supplemental Initial Non-Infringement and Invalidity Contentions Pursuant to Local Patent Rule 2.3; *Chamberlain* vs. *Linear LLC and Nortek Security & Control LLC*; Case No. 1 :14-cv-05197; 7 pages, Dated May 6, 2015.
The Chamberlain Group Inc.'s Initial Response to Defendants' First Supplemental Initial Invalidity Contentions; *Chamberlain* vs. *Linear LLC and Nortek Security & Control LLC*; Case No. 1:14-cv-05197; 5 pages, Dated Jun. 5, 2015.
Canadian Patent Application No. 2,533,795; Office Action Dated Jan. 9, 2015.
British Combined Search and Examination Report Under Section 17 and 18(3) from British Application No. GB0713690.6 Dated Oct. 17, 2007.
British Search Report Under Section 17 Dated Dec. 20, 2007 for Application No. GB0713690.6.
European Patent Application No. EP 1 280 109 A3; European Search Report dated Aug. 1, 2005.
International Search Report and Written Opinion for PCT/US2014/057405 dated Dec. 17, 2014.
James Y. Wilson and Jason A. Kronz; Inside Bluetooth Part II, Dr. Dobb's Portal; The World of Software Development; Dr.Dobb's Journal; Jul. 22, 2001; 9 pages.
Sensory, Inc. RSC-300/364 Data Book, Jan. 2001 (55 pages).
U.S. Office Action dated Sep. 24, 2014 from U.S. Appl. No. 12/971,374.

* cited by examiner

SYSTEM INTERACTION WITH A MOVABLE BARRIER OPERATOR METHOD AND APPARATUS

CROSS REFERENCE TO RELATED APPLICATIONS

This application is a continuation application of U.S. patent application No. 12/971,374, filed on Dec. 17, 2010, now U.S. Pat. No. 9,495,815, which is a continuation of U.S. patent application Ser. No. 12/341,658, filed on Dec. 22, 2008, now U.S. Pat. No. 7,876,218, which is a continuation of U.S. patent application Ser. No. 11/044,928 filed Jan. 27, 2005, now U.S. Pat. No. 7,482,923, each of which is hereby incorporated herein by reference in their entireties. This application is also related to U.S. patent application Ser. No. 12/435,822 filed on May 5, 2009, now U.S. Pat. No. 7,852,212 and U.S. patent application Ser. No. 12/967,505 filed on Dec. 14, 2010, now U.S. Pat. No. 8,144,011, each of which is hereby incorporated herein by reference in their entireties.

TECHNICAL FIELD

This invention relates generally to movable barrier operators and more particularly to communications therewith.

BACKGROUND

Movable barrier operators of various kinds are known in the art. Such movable barrier operators often work in conjunction with a corresponding movable barrier such as a single panel or segmented garage door, a rolling shutter, a pivoting, swinging, or sliding gate or arm barrier, and so forth. In particular, the movable barrier operator typically responds to user inputs (often as input via a remotely located user interface) to effect selective movement of a corresponding movable barrier (for example, to transition the movable barrier back and forth between a closed and an opened position). Some movable barrier operators have additional functionality. For example, some movable barrier operators are able to control the illumination state of one or more light sources.

Alarm systems, including but not limited to intrusion detection alarm systems, are also known in the art. Such systems often serve to monitor one or more intrusion detectors and to respond to a detected intrusion with a corresponding action. Exemplary actions include sounding an audible alarm, illuminating or flashing one or more light sources, automatically sourcing a page, telephone call, or the like to notify one or more predetermined parties of the detected intrusion, and so forth.

In many cases, a building or residence having an alarm system will also have one or more movable barrier operators. There have been some prior efforts to effect communications and/or cooperation as between such elements. For example, the X10 standard has been employed to effect relatively simplistic communications (such as indicating a present status of a movable barrier to an alarm system or to permit an alarm system controller to also control activation of a movable barrier operator).

To date, such proposals are relatively simple and do not permit or facilitate much potential depth or capacity with respect to leveragable functionality. As a practical result, for the most part, little integration has occurred in the marketplace. At least one problem posed by seeking more powerful cooperation between such elements relates to increasing the likelihood that an unauthorized individual may be able to take advantage of the necessarily expanded communication link(s) as are used to support such cooperation and thereby impair or defeat the alarm system itself, the movable barrier operator, or both. Another problem reflects an apparent present perception on the part of at least some persons skilled in the art that the possible benefits of supporting such cooperation are relatively negligible in comparison to the perceived costs of implementation and risk to overall security and effectiveness.

BRIEF DESCRIPTION OF THE DRAWINGS

The above needs are at least partially met through provision of the alarm system interaction with a movable barrier operator method and apparatus described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, one provides a secure communication link between a movable barrier operator and a peripheral alarm system and then effects at least one communication between these elements using that secure communication link.

The secure communication link can comprise, for example, an encrypted wireless communication link, a non-wireless communication link, or the like. The communication can comprise, for example, data such as, but not limited to, an instruction to the movable barrier operator. Depending upon the needs of a given application, the peripheral alarm system can be responsive to data as is received from the movable barrier operator and/or the movable barrier operator can respond to operational instructions as are sourced by the peripheral alarm system.

Various capabilities and corresponding benefits are readily facilitated by these actions. As an illustrative example, when a given alarm system has a corresponding actuation time delay (to permit, for example, a home owner to vacate their premises prior to the alarm system arming itself), use and/or control of that actuation time delay can be further informed, controlled, or influenced by a present (or recent) operational state of a corresponding movable barrier operator. For example, the actuation time delay may be effectively lengthened (or shortened) as a function, at least in part, of whether the garage door of a home is opened, opening, closed, or closing.

Figure 1:
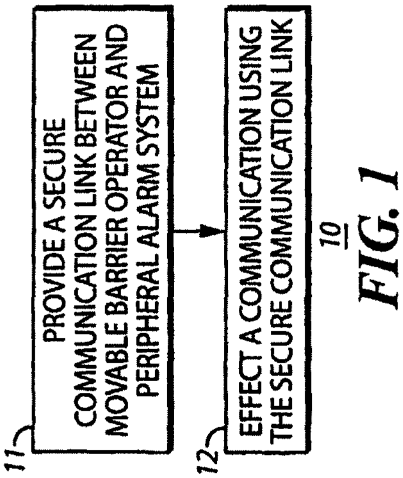
FIG. 1 comprises a flow diagram as configured in accordance with various embodiments of the invention.

These and other benefits may become clearer upon making a thorough review and study of the following detailed description. Referring now to the drawings, and in particular to FIG. 1, these teachings generally encompass a process 10 that provides 11 a secure communication link between a movable barrier operator and a peripheral alarm system. The secure communication link generally comprises a monitoring resistant pathway such as, but not limited to, an encrypted wireless communication link (based, for example, on a radio frequency or light frequency carrier), a non-wireless communication link (such as, for example, an electrical or optical signal conduit) and so forth.

Certain approaches to securing such a communication path are set forth in a co-owned patent application bearing U.S. patent application Ser. No. 11/044,411, now U.S. Pat. No. 7,071,850, entitled METHOD AND APPARATUS TO FACILITATE TRANSMISSION OF TERNARY MOVABLE BARRIER OPERATOR INFORMATION, the contents of which are fully incorporated herein by this reference.

Accordingly, by one approach this communication path can comprise a rolling code-based authentication protocol. This rolling code-based authentication protocol, in turn, can employ ternary data. For example, ternary data as corresponds to a communication path endpoint can be converted into a binary format (such as corresponding pairs of binary bits) and then transmitted to a recipient platform. Such a process can achieve an encryption effect.

Depending upon the needs of a given application setting, the secure communication link can comprise a dedicated link as between the movable barrier operator and the peripheral alarm system or can be shared or multiplexed in some manner with other elements. (Those skilled in the art will recognize that additional other communication links, including either or both secure and non-secure communication links, can also be provided as between the movable barrier operator and the peripheral alarm system, if desired.)

This process 10 then generally effects 12 at least one communication as between the movable barrier operator and the peripheral alarm system using the secure communication link. This communication can be directed from the movable barrier operator to the peripheral alarm system and/or vice versa, depending upon the needs and capabilities that characterize a given application setting. Pursuant to a preferred approach this communication comprises, at least in part, data (such as status information as pertains to one or the other of the movable barrier operator and the peripheral alarm system, confirmation messages, instructions, and so forth).

Effecting 12 this communication can also comprise, in a given deployment, effecting an action at one and/or the other of the movable barrier operator and the peripheral alarm system in response to receiving and/or sourcing the at least one communication. For example, the communication itself can comprise an instruction to the movable barrier operator regarding subsequent movement of a movable barrier as is controlled, at least in part, by the movable barrier operator. In such a case, the movable barrier operator may then respond to receipt of this instruction with a compliant action to cause the movable barrier to move as instructed. As another example, the peripheral alarm system may effect a given action as a function, at least in part, of receiving data from the movable barrier operator.

So configured, a movable barrier operator and a peripheral alarm system are able to communicate with one another with respect to information that may be useful to their relative operating strategies and/or with respect to specific instructions that one element can usefully execute to benefit or otherwise match or supplement the operations of the opposing element.

Figure 2:
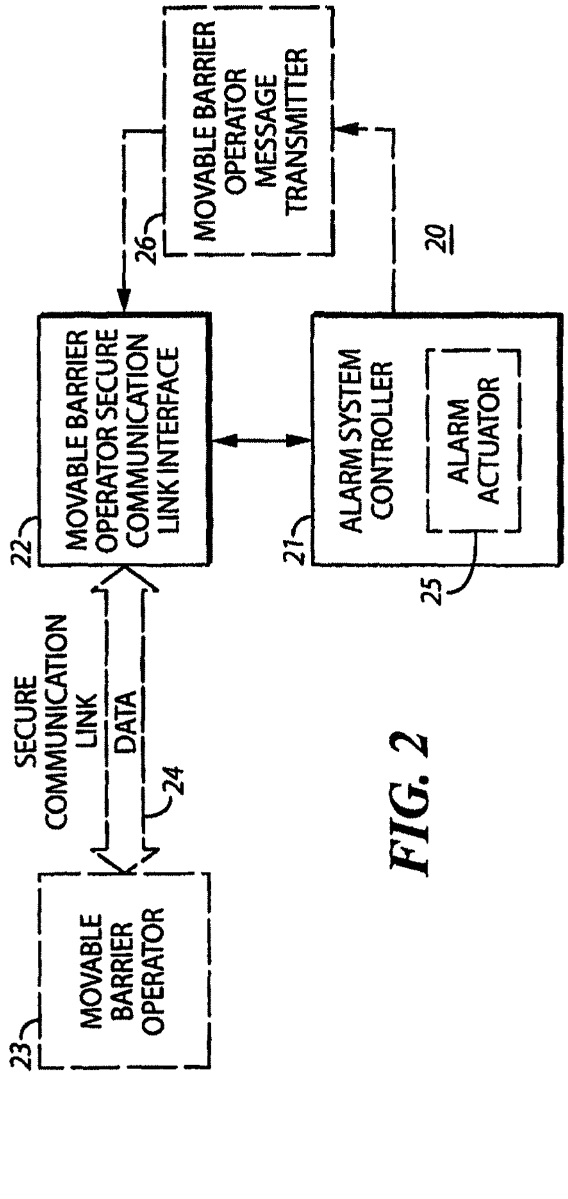
FIG. 2 comprises a block diagram as configured in accordance with various embodiments of the invention.

There are various ways to effect the above-described process 10. An illustrative example will now be set forth with reference to FIG. 2.

In this illustrative embodiment, an alarm control system 20 comprises an alarm system controller 21 that serves to generally receive data (regarding, for example, a monitored premises), to process that data with respect to various rules and tests, and to provide alarms and other actions in accordance with a given operating strategy. Such alarm system controllers 21 are generally well understood in the art. In addition, these teachings are not especially sensitive to the selection or use of any particular alarm system controller. Therefore, further elaboration will not be provided here for the sake of brevity and the preservation of narrative focus aside from noting that such alarm system controllers 21 are often partially or wholly programmable and can therefore be readily programmed to operate as described herein.

In this illustrative embodiment the alarm system controller 21 operably couples to a movable barrier operator secure communication link interface 22. The latter, in turn, comprises the interface that effects compatible interaction with a corresponding movable barrier operator 23 via a given secure communication link 24. So configured, the alarm system controller 21 is able to receive data from the movable barrier operator 23 via the secure communication link 24. As per these teachings, the alarm system controller 21 is then able to respond in some appropriate way to such received data.

In a preferred approach, the alarm system controller 21 comprises, in part, an alarm actuator 25. This alarm actuator 25, in a preferred embodiment, has a corresponding actuation time delay and serves, for example, to delay the arming of the alarm system in order to permit an authorized user to leave their house without fear that an alarm will sound upon detecting the opening of the egress door. In such a case (i.e., when the alarm actuator 25 comprises at least in part an alarm arming actuator), the operation of the alarm actuator 25 can be modified appropriately in response to receipt of information from a corresponding movable barrier operator. For example, arming of the alarm system can be delayed longer than is usual upon being advised by the movable barrier operator that the movable barrier operator's movable barrier (such as a garage door) has been opened but not yet closed (which may indicate, for example, that the authorized user has not yet completely left the premises).

As another example, when the alarm actuator 25 comprises an alarm disarming actuator (to automatically disarm the alarm system when it is otherwise armed), information received from the movable barrier operator can again be used to influence and inform this disarming functionality. To illustrate, when the movable barrier operator receives a remote control signal comprising an instruction to open the movable barrier, this information can be passed to the alarm system controller 21 as per these teachings and then used to trigger a full or temporary disarming of the alarm system in anticipation of the arrival of an authorized user.

Such actions can vary with the needs and requirements of a given application and can also vary with the substantive content of the conveyed information. Similarly, the precise information conveyed can vary with the needs and requirements of a given setting. Some illustrative examples include, but are certainly not limited to:

- reception of a remotely sourced movable barrier operator command signal;
- a current position of a movable barrier;
- initiation of movement of the movable barrier;
- current movement of the movable barrier;
- cessation of movement of the movable barrier;
- reversal of movement of the movable barrier;
- detection of an obstacle in a pathway of the movable barrier; and
- unauthorized movement of the movable barrier;

to name a few.

As noted above, it may be useful in some settings for the alarm system controller 21 to itself convey information to a movable barrier operator (to permit, for example, providing a specific instruction to the movable barrier operator such as an instruction to illuminate one or more lights, to move the movable barrier to a particular position, to maintain a present position of the movable barrier, and so forth). In such a case a movable barrier operator message transmitter 26 can be provided to effect such transmissions. (Those skilled in the art will recognize and appreciate that such functionality can comprise stand-alone capability (as suggested by the illustration) or can be integrated with other elements of the alarm system such as the alarm system controller 21 and/or the movable barrier operator secure communication link interface 22.)

Figure 3:
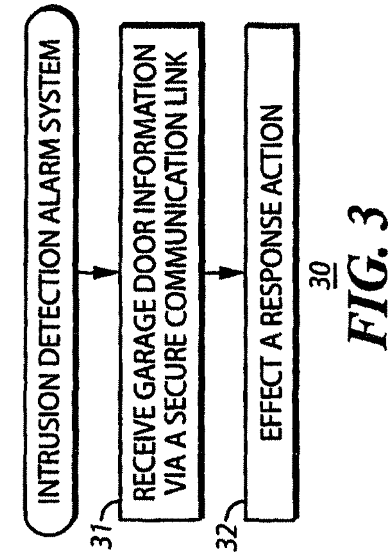
FIG. 3 comprises a flow diagram as configured in accordance with various embodiments of the invention.

Referring now to FIG. 3, and pursuant to a preferred though optional approach, an intrusion detection alarm system is preferably configured and programmed 30 to, upon receiving 31, via a secure communication link, information regarding at least one of an operational status and received operational commands as corresponds to a movable barrier operator (such as, for example, a garage door opener), by automatically effecting 32 at least one responsive action (such as an action that corresponds to at least one of arming and disarming an intrusion detection alarm). As one illustrative example, some movable barrier operators are able to detect an unauthorized opening of a movable barrier (in some cases, such a movable barrier operator is then further configured to oppose that opening movement of the movable barrier by using a motor to drive the movable barrier back to a predetermined position (such as a fully closed position)). Pursuant to these teachings, such a movable barrier operator could also, upon detecting an unauthorized opening of a movable barrier, provide a corresponding signal to a peripheral alarm system. The latter could then, for example, respond by sounding an alarm, illuminating one or more lights, transmitting an automated request for assistance, or the like.

Pursuant to one approach, the effected action can comprise, at least in part, the transmission of an external communication (such as, but not limited to, a command to the garage door opener, an inquiry to the garage door opener, a command to a peripheral alert mechanism, a message (intended, for example, for an authorized or unauthorized user of the movable barrier operator), to name a few).

Pursuant to these teachings, a movable barrier operator and a peripheral alarm system are able to securely communicate with one another. This security, in turn, permits each to rely upon the communications of the other. For example, the peripheral alarm system can rely upon status information from the movable barrier operator and take actions such as disarming its alarm capability with reduced concern that this action may be inappropriate. As another example, the movable barrier operator can rely upon specific operational instructions as may be provided by the peripheral alarm system and take actions that are otherwise contrary to its operating strategy. This, in turn, permits various useful opportunities to leverage the respective capabilities and information sources of both such elements in a way that supplements and benefits one, the other, or both.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

I claim:

1. An apparatus comprising:

a peripheral system controller configured to control an alarm system;

a movable barrier operator secure communication link interface configured to send communications to a movable barrier operator over a local secure encrypted communication link between the movable barrier operator and the alarm system;

wherein the peripheral system controller is peripheral to the movable barrier operator and configured to:

receive from the movable barrier operator at least one information communication using the local secure encrypted communication link, wherein the information communication comprises, at least in part, movable barrier operator status information;

receive a movable barrier movement command; and send via the local secure encrypted communication link at least one signal representative of an encrypted information communication comprising, at least in part, a command configured to effect movement of a barrier by the movable barrier operator.

2. The apparatus of claim 1 wherein the peripheral system controller is configured to cause an action regarding providing egress to a secured area.

3. The apparatus of claim 1 wherein the peripheral system controller is configured to receive the movable barrier operator status information comprising information regarding detection of attempted movement of the movable barrier.

4. The apparatus of claim 1 wherein the movable barrier operator secure communication link interface is configured to employ a rolling-code based authentication protocol.

5. The apparatus of claim 1 wherein the secure communication link interface between the movable barrier operator and the peripheral system controller includes an additional communication link.

6. The apparatus of claim 5 wherein the additional communication link is secure.

7. The apparatus of claim 5 wherein the additional communication link is non-secure.

8. A method of controlling access to a secured area with a movable barrier operator and a movable barrier with a local secure wireless encrypted communication link between at least the movable barrier operator and a control system configured to control an alarm system, the control system is peripheral to the movable barrier operator, the movable barrier operator configured to control movement of the movable barrier, the control system also peripheral to and configured to communicate with movable barrier operator devices that are peripheral to the movable barrier operator, the method comprising:

receiving by the control system from the movable barrier operator at least one information communication using the local secure wireless encrypted communication link between the movable barrier operator and the control system of the alarm system, wherein the information communication comprises, at least in part, movable barrier operator status information;

receiving, by the control system, a movable barrier movement command; and effecting at least one wireless signal representative of an encrypted information communication from the control system using the local secure wireless encrypted communication link, the at least one wireless signal comprising, at least in part, a command configured to effect movement of the movable barrier by the movable barrier operator.

9. The method of claim 8 further comprising performing a control action in response to the control system receiving the wireless signal representative of the at least one information communication from the movable barrier operator.

10. The method of claim 9 wherein effecting at least one wireless signal representative of the encrypted information communication further comprises:

effecting at least one control system action as a function, at least in part, of the movable barrier operator status information.

11. The method of claim 9 wherein effecting at least one wireless signal representative of the encrypted information communication comprises employing a rolling-code based authentication protocol.

12. The method of claim 9 wherein the secure wireless encrypted communication link between at least the movable barrier operator and the control system includes an additional communication link.

13. The method of claim 12 wherein the additional communication link is secure.

14. The method of claim 12 wherein the additional communication link is non-secure.

15. The apparatus of claim 1 wherein the movable barrier operator is configured to detect reversal of movement of the movable barrier operator.

16. An apparatus comprising:

a peripheral system controller configured to control an alarm system;

a movable barrier operator secure communication link interface configured to send communications to a movable barrier operator over a local secure encrypted communication link;

wherein the peripheral system controller is peripheral to the movable barrier operator and configured to:

receive from the movable barrier operator at least one information communication using the local secure encrypted communication link, wherein the information communication comprises, at least in part, movable barrier operator status information;

receive a movable barrier movement command; and send via the local secure encrypted communication link at least one signal representative of an encrypted information communication comprising, at least in part, a command configured to effect movement of a barrier by the movable barrier operator; and wherein the movable barrier operator is configured to detect reversal of movement of the movable barrier operator and notify the peripheral system controller of the reversal of movement.

17. An apparatus comprising:

a peripheral system controller configured to control an alarm system;

a movable barrier operator secure communication link interface configured to send communications to a movable barrier operator over a local secure encrypted communication link;

wherein the peripheral system controller is peripheral to the movable barrier operator and configured to:

receive from the movable barrier operator at least one information communication using the local secure encrypted communication link, wherein the information communication comprises, at least in part, movable barrier operator status information;

receive a movable barrier movement command; and send via the local secure encrypted communication link at least one signal representative of an encrypted information communication comprising, at least in part, a command configured to effect movement of a barrier by the movable barrier operator; and wherein the peripheral system control is configured to disarm the alarm system in response to an indication that the movable barrier operator has received an instruction to open.

18. The method of claim 8 further comprising detecting reversal of movement of the movable barrier operator.

19. A method of controlling access to a secured area with a movable barrier operator and a movable barrier with a local secure wireless encrypted communication link between at least the movable barrier operator and a control system configured to control an alarm system, the control system is peripheral to the movable barrier operator, the movable barrier operator configured to control movement of the movable barrier, the control system also peripheral to and configured to communicate with movable barrier operator devices that are peripheral to the movable barrier operator, the method comprising:

receiving by the control system from the movable barrier operator at least one information communication using the local secure wireless encrypted communication link, wherein the information communication comprises, at least in part, movable barrier operator status information;

receiving, by the control system, a movable barrier movement command;

effecting at least one wireless signal representative of an encrypted information communication from the control system using the local secure wireless encrypted communication link, the at least one wireless signal comprising, at least in part, a command configured to effect movement of the movable barrier by the movable barrier operator;

detecting reversal of movement of the movable barrier operator; and notifying the control system of the reversal of movement of the movable barrier operator upon detection thereof.

20. A method of controlling access to a secured area with a movable barrier operator and a movable barrier with a local secure wireless encrypted communication link between at least the movable barrier operator and a control system configured to control an alarm system, the control system is peripheral to the movable barrier operator, the movable barrier operator configured to control movement of the movable barrier, the control system also peripheral to and configured to communicate with movable barrier operator devices that are peripheral to the movable barrier operator, the method comprising:

receiving by the control system from the movable barrier operator at least one information communication using the local secure wireless encrypted communication link, wherein the information communication comprises, at least in part, movable barrier operator status information;

receiving, by the control system, a movable barrier movement command;

effecting at least one wireless signal representative of an encrypted information communication from the control system using the local secure wireless encrypted communication link, the at least one wireless signal comprising, at least in part, a command configured to effect movement of the movable barrier by the movable barrier operator; and disarming the control system in response to receipt of a notification that the movable barrier operator has received an instruction to open.

* * * * *